Patented July 3, 1923.

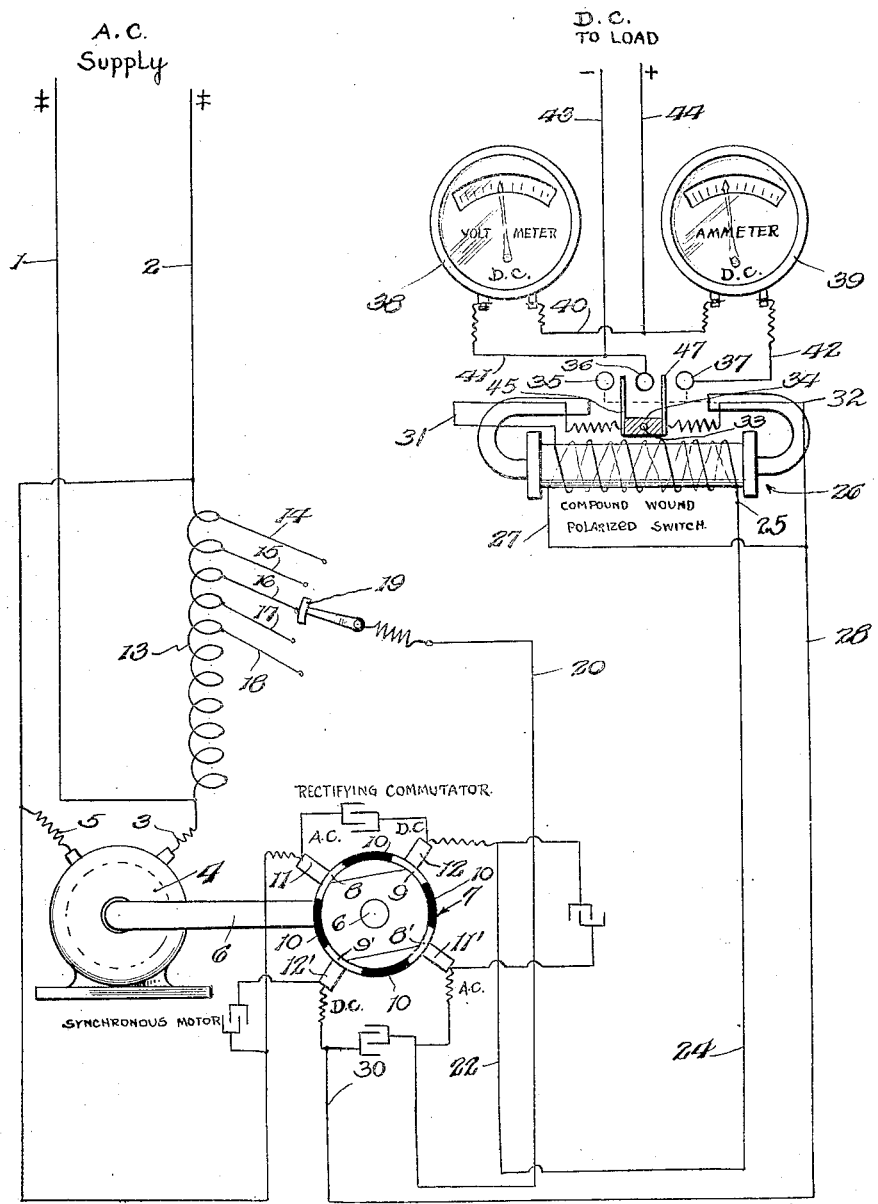

1,460,444

UNITED STATES PATENT OFFICE.

JOHN W. ROBINSON, OF MACON, GEORGIA.

MECHANICAL RECTIFYING SYSTEM.

Application filed October 8, 1920. Serial No. 415,566.

*To all whom it may concern:*

Be it known that I, JOHN W. ROBINSON, a citizen of the United States, residing at Macon, in the county of Bibb and State of Georgia, have invented certain new and useful Improvements in Mechanical Rectifying Systems, of which the following is a specification.

This invention relates to a mechanical rectifying system for deriving a uni-directional current from an alternating current source.

More particularly defined the invention has reference to a system for performing the above described function in such a manner that the resulting current is of proper quality for use in connection with the charging of storage batteries and the like.

I am, of course, aware that previous to my invention rectifying systems of the mechanical class had been in general use, but I aim with the present invention to provide a relatively inexpensive system in which the load may be altered, as desired, without causing sparking, and also the system is so designed that there is no danger of the introduction into the load line of current of undesired polarity.

In my system, according to the present invention, an alternating current is fed to a synchronous motor through an auto-transformer from which various voltages may be selectively taken. The synchronous motor has combined therewith a rectifying commutator in such manner that the motor receives the full line current while the rectifying commutator receives only the selective voltage passing through the auto-transformer. This rectifying commutator consists of live segments separated by dead segments and engaged by diametrically opposite pairs of alternating and direct current brushes, the leads of which are connected with a compound wound polarized switch the function of which is to prevent current of undesirable polarity from passing through the load should such a current be at any time present at the direct current brushes. Condensers are provided and connected across the brushes for the purpose of eliminating any sparking which might otherwise occur.

The usual registering instruments such as an ammeter and volt meter are connected in the circuit to the load.

In the drawings:

The diagrammatic view illustrated shows a specific embodiment of a preferred form of the system constituting the present invention.

In detail:

The leads 1 and 2 represent the terminals of an alternating current supply. The lead 1 is connected by the wire 3 to one terminal of a synchronous motor 4, while the lead 2 is connected by the wire 5 with the other terminal of such motor.

On the shaft 6 of the said synchronous motor 4 is mounted a commutator 7 having the segments 8, 8' and 9, 9' which are arranged in pairs and separated by the dead segments 10.

At diametrically opposite points around the commutator 7 and bearing on the said segments of the commutator are positioned the pairs of alternating current and direct current brushes indicated respectively as 11, 11', and 12, 12'.

Interposed in the lead 2 from the alternating current supply and intermediate the wire 3 and the said lead 2 is the winding 13 of an auto-transformer having leads 14, 15, 16 17 and 18 taken off therefrom and which are arranged to be crossed by the controller contact 19 of the said auto-transformer and which is connected with a wire 20 leading to the alternating current brush 11' and whereby the operation of the controller contact 19 will serve to deliver any selected voltage from the alternating current supply to the rectifying commutator 7.

The direct current brush 12 is connected by the wire 22 with the wire 24 which connects with one pole 25 of a compound wound polarized switch 26, while the other pole 27 of said switch is connected through the winding of the switch with the wire 28 leading to the wire 30 connected with the direct current brush 12'. The remaining terminal of the winding of the compound wound polarized switch 26 is connected by a wire 31 with the wire 28 as indicated at 32 so that if, by chance, a current of undesirable polarity should pass out of the direct current brushes 12 and 12' the winding of the compound wound polarized switch 26 would be deenergized and thus permit the poles 25 and 27 of the said switch 26 to assume an inoperative position with respect to the pivot 33 of the insulating block 34 which serves to separate the pole pieces 45 and 47 and forms the mounting therefor. Condensers, as shown, are connected between the respective brushes in the manner indicated in order to eliminate sparking.

The contacts 35, 36 and 37 of the switch 26 are arranged to be engaged by the poles 45 and 47 mounted on the pivot block 34.

A direct current ammeter 39 and the volt meter 38 are connected in series by the wire 40, while the wire 41 connects with the contact 36 and the wire 42 connects with the contact 37 which is also connected through to the contact 35, and thus the direct or unidirectional current produced by the rectifying action of the commutator in operation is taken off to the load through the wires 43 and 44 leading from the wires 40 and 41.

I claim:

In a system for producing a unidirectional current, the combination with a source of alternating current, of a load circuit, connections forming a circuit between the current source and the load circuit and including a rectifying commutator with a pair of oppositely positioned D. C. brushes and a pair of similarly positioned A. C. brushes between said D. C. brushes, an auto transformer provided with taps for selectively controlling the voltage of the rectified current, and condensers for eliminating sparking, said condensers forming connections between each pair of said A. C. and D. C. brushes, the fixed terminal of said auto-transformer being connected to the junction of a condenser and an A. C. brush, and a movable terminal of the auto-transformer being similarly connected to the junction of the other A. C. brush and its condenser.

In testimony whereof I affix my signature.

JOHN W. ROBINSON. [L. S.]